(12) United States Patent
Lawson

(10) Patent No.: US 10,645,858 B2
(45) Date of Patent: May 12, 2020

(54) SYSTEM AND METHOD FOR GUIDED LINE ACQUISITIONS

(71) Applicant: Deere & Company, Moline, IL (US)

(72) Inventor: Joshua T. Lawson, Polk City, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/279,357

(22) Filed: Sep. 28, 2016

(65) Prior Publication Data

US 2018/0084710 A1 Mar. 29, 2018

(51) Int. Cl.
*A01B 69/00* (2006.01)
*A01B 69/04* (2006.01)
*B62D 15/02* (2006.01)

(52) U.S. Cl.
CPC .......... *A01B 69/008* (2013.01); *B62D 15/025* (2013.01)

(58) Field of Classification Search
CPC combination set(s) only.
See application file for complete search history.

(56) References Cited

U.S. PATENT DOCUMENTS

| | | | |
|---|---|---|---|
| 9,101,090 B2 * | 8/2015 | Pierce | A01D 41/1278 |
| 2004/0193348 A1 * | 9/2004 | Gray | A01B 69/008 701/50 |
| 2006/0167600 A1 | 7/2006 | Nelson, Jr. et al. | |
| 2012/0215395 A1 * | 8/2012 | Aznavorian | G05D 1/021 701/25 |
| 2013/0304300 A1 | 11/2013 | Peake et al. | |
| 2015/0342110 A1 | 12/2015 | Peake et al. | |
| 2016/0057921 A1 | 3/2016 | Pickett et al. | |

FOREIGN PATENT DOCUMENTS

WO WO 2005/119386 A1 12/2005

OTHER PUBLICATIONS

European Patent Office, European Search Report for European Patent Application No. 17191331 (dated Jan. 4, 2018).

* cited by examiner

*Primary Examiner* — Adam D Tissot
*Assistant Examiner* — Edward J Pipala
(74) *Attorney, Agent, or Firm* — Neal, Gerber & Eisenberg LLP; James P. Muraff

(57) ABSTRACT

Various embodiments of the present disclosure provide a guided line acquisition system and method for generating a path of a vehicle from its current location to a final guidance line. This path is referred to hereinafter as an acquisition path. The generated acquisition path starts at the current vehicle position and ends co-linear to the final guidance path. The acquisition path is generated using one constraint and one objective parameter. More specifically, the acquisition path is constrained by the minimum turning radius of the vehicle and angle of approach criteria, (i.e., the maximum heading relative to the guidance line). It should be appreciated that while the guided line acquisition system attempts to find an acquisition path that meets the angle of approach criteria, the guidance acquisition system will allow this objective to be sacrificed when it is not possible due to the minimum turning radius of the vehicle.

25 Claims, 5 Drawing Sheets

SYSTEM AND METHOD FOR GUIDED LINE ACQUISITIONS

TECHNICAL FIELD

This application generally relates to systems and methods for automatically generating an approach (or acquisition) path to a final guidance path for a work vehicle.

BACKGROUND

Work vehicles may be used for agricultural, forestry, construction, mining, applications that require off-road or other applications that require operation along one or more paths to traverse or navigate a work area. For example, a work vehicle (e.g., tractor) may be required to plant or harvest crops in an area of a field, or to distribute crop inputs, such as fertilizer or chemicals, over plants in the field. Many work vehicles include guidance systems to assist vehicle operators or drivers in planning a path or route for the vehicle to follow during field operations.

Once a guidance line path is identified, if the vehicle is not already on the final guidance line path, the vehicle and any attached implement must travel to the guidance line path. Existing systems direct the vehicle towards the final guidance line path without any consideration of the vehicle's current position or any other vehicle constraints. As such, existing systems produce absolute lateral and heading errors to the guidance controls system, which yields unpredictable paths to the true guidance line. This leads to an increased period of time and distance traveled in error, or outside of the guidance line path. Accordingly, there is still a need in the art for an intelligent vehicle guidance system and method that can effectively and precisely plan a path for the vehicle to reach a final guidance line path during operation of the vehicle.

SUMMARY

Various embodiments of the present disclosure provide a guided path (e.g., guided line) acquisition system and method for generating a path of a vehicle from its current location to a final guidance path. The guidance path between the current vehicle location and the final guidance path is referred to hereinafter as an acquisition path. The generated acquisition path starts at the current vehicle position and ends when the vehicle is co-linear to at least a segment of the final guidance path. The acquisition path is generated using one constraint and one objective parameter. More specifically, the acquisition path is constrained by the minimum turning radius of the vehicle or the turning radius of the implement, whichever is larger depending on the mode of operation. The acquisition path is further constrained by criteria such as an angle of approach, (i.e., the maximum heading relative to the guidance line). It should be appreciated that while the guided line acquisition system attempts to find an acquisition path that meets the angle of approach criteria, the guidance acquisition system will allow this objective to be sacrificed when it is not possible due to the minimum turning radius of the vehicle.

In one embodiment of the present disclosure, the guided line acquisition system includes a location-determining receiver for determining location data representing a current vehicle location, and a guidance module for determining the acquisition path based on a minimum turn radius of the vehicle and/or the minimum turn radius of the implement, and an angle of approach towards the final guidance line. The system further includes a user interface for receiving a user input to engage automation of an acquisition path for the vehicle to reach the final guidance line. In addition, the system includes a data storage device for storing the guidance module and the guidance database, and a data processor in communication with the data storage device for execution of the guidance module. After generation of any acquisition path, the guided line acquisition system is configured to communicate with a vehicle controller for controlling the path of the vehicle in accordance with any generated acquisition path.

As will be appreciated, this disclosure is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1A:
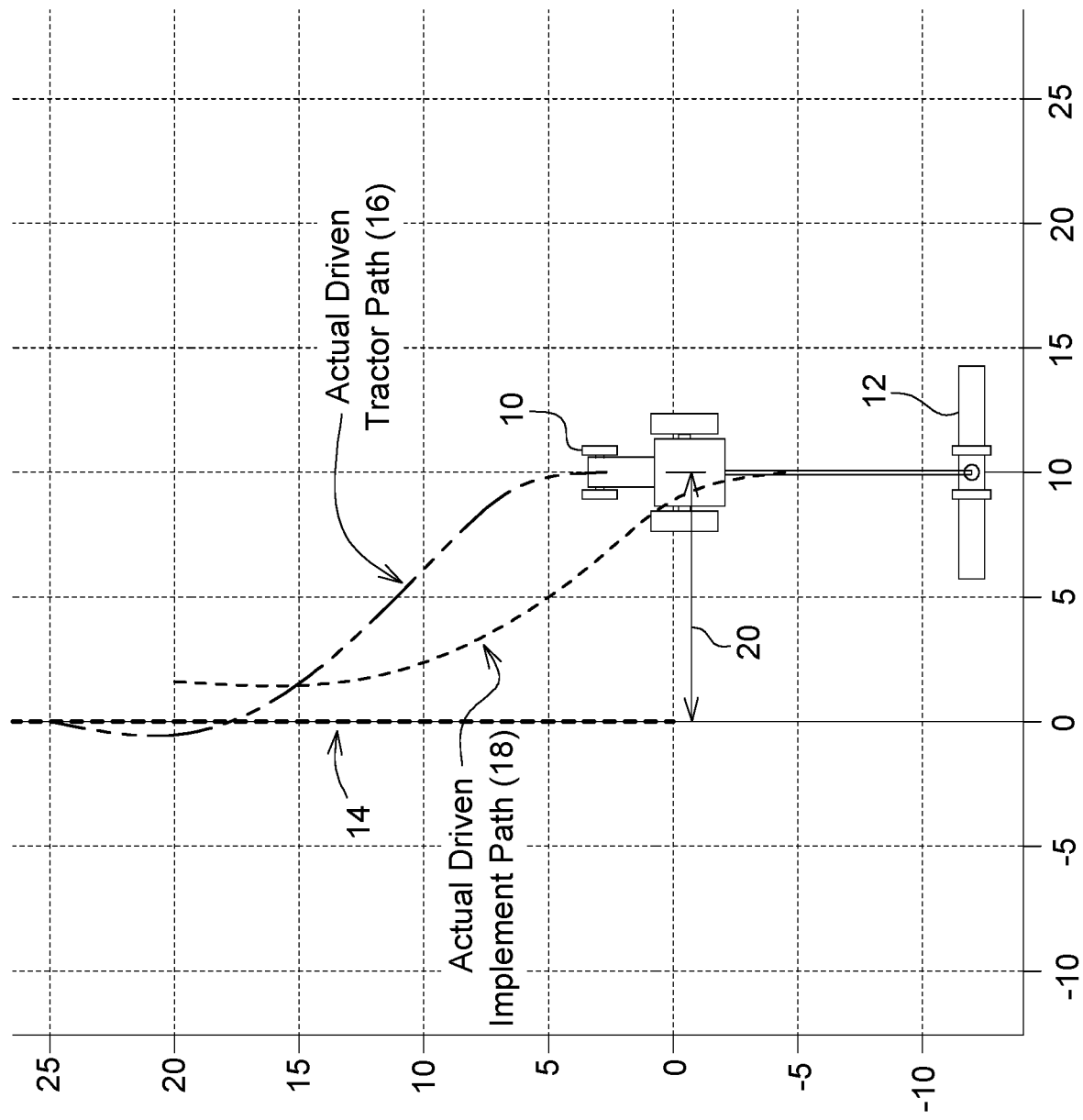
FIG. 1A is a graph illustrating a vehicle path from a first location to a final guidance line using the prior art system.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

As used herein, the term "final guidance line" refers to a boundary, linear edge, or other geographical path defined by one or more straight lines, curved lines, arcs, line segments, or series of points or coordinates. Also as used herein, the term "acquisition path" refers to a planned path for the vehicle to follow to reach the final guidance line from its current location. Often the path of the vehicle is adjusted so that any attached implement will track a particular path. The path of the vehicle can also be limited if plants or hazards (e.g., waterways) are present, however to avoid crushing plants or entering hazardous areas.

Various embodiments of the present disclosure provide a guided line acquisition system and method for automatically generating acquisition path to a final guidance line. Existing systems direct the vehicle towards the final guidance line path without any consideration of the vehicle's current position or any other vehicle constraints. As such, existing systems yields unpredictable paths to the true guidance line, which lead to an increased period of time and distance traveled in error, or outside of the guidance line path and produce absolute lateral and heading errors to the guidance controls system. More specifically, certain existing systems utilize systems such as AutoTrac, which include a closed loop navigation controller. Such existing systems force the guidance module to track two sets of gains (i.e., acquiring and tracking) to keep steering commands from saturating. These existing systems provide vague acquisition shaping through closed loop tuning. As a result, the acquisition is sub-optimal and requires more distance or time to get to the final guidance path.

Turning to FIG. 1A, which depicts a graph of a vehicle 10 path to a final guidance line 14 using an existing prior art system. As illustrated in FIG. 1A, in this example embodiment, the final guidance line 14 is along the y-axis of the graph (i.e., the zero line). The actual driven tractor path 16 is the path that the AutoTrac system drives as a result of the way the controller has been tuned for the vehicle 10. In this embodiment, the vehicle 10 includes an implement 12, which follows a separate path 18 as it is dragged along with the vehicle 10. As illustrated in FIG. 1A, this kind of an automatically generated path creates an absolute lateral error 20. The absolute lateral error represents the distance between the instantaneous position and the final guidance at each point in time.

Various embodiments of the present disclosure reduce the distance it takes to get the vehicle and implement on the final line by planning and generating an acquisition path that starts at the current vehicle position and ends co-linear to the final guidance path. For example, turning to FIG. 1B, which illustrates one example embodiment of a vehicle 10 that includes the guided line acquisition system of the present disclosure. In this example embodiment, vehicle 10 is to reach final guidance line 14, which is along the y-axis of the graph. The guided line acquisition system first determines the current vehicle position. The current vehicle position information includes the current position and the current heading of the vehicle.

Next, the guided line acquisition system generates the acquisition path 22 from the current vehicle 10 position to the final guidance line 14 using one constraint and one objective parameter. In this example embodiment, the vehicle guided line acquisition system determines the planned guided acquisition path 22 based on the minimum turn radius of the vehicle and based on an angle of approach (AoA) towards the final guidance line 14. The angle of approach is the maximum heading of the acquisition path relative to the guidance line. In certain embodiments, the angle of approach is user-specified. It should be appreciated that while the guided line acquisition system attempts to find an acquisition path that meets the angle of approach criteria, the guidance acquisition system will allow this objective to be sacrificed when it is not possible due to the minimum turning radius of the vehicle.

Figure 1B:
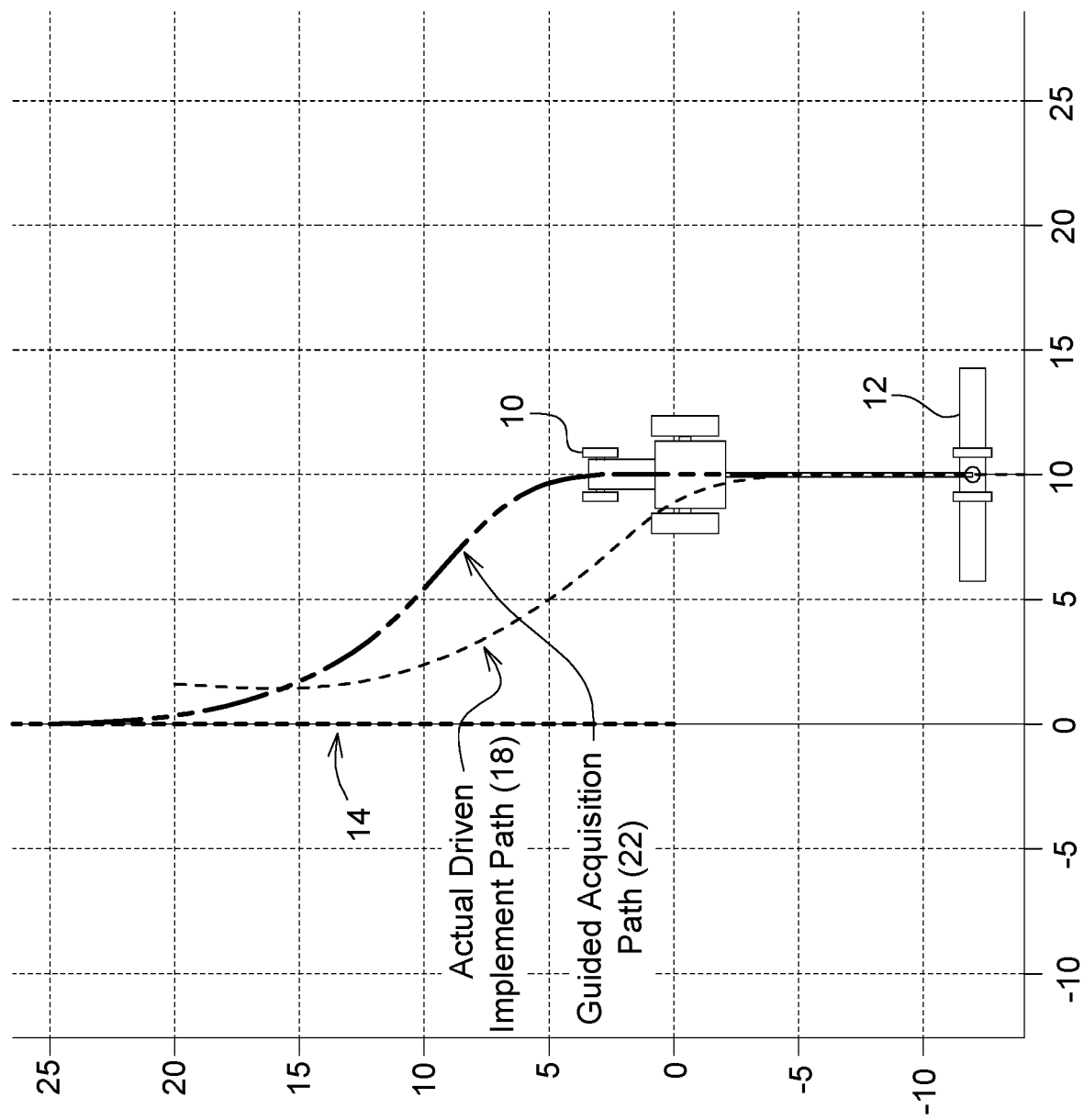
FIG. 1B is a graph illustrating a vehicle path from a first location to a final guidance line using the guided line acquisition system of the present disclosure, in accordance with certain embodiments.

As illustrated in FIG. 1B, the guided line acquisition system utilizes this information to generate acquisition path 22 for the vehicle to follow to reach the final guidance line 14. As illustrated in this embodiment, the acquisition path 22 and final guidance line 14 are co-linear at 25 m along the line 14. It should be appreciated that the guided line acquisition path 22 reduces the distance along the final guidance line 14, or how far the user has traveled into the work area before the implement is positioned correctly. By utilizing the guided line acquisition system of the present disclosure, the guided line acquisition system provides an achievable command to the vehicle by first determining a planned acquisition path 22 to the final guidance line 14.

There are at least two levels of benefit that result from use of the guided line acquisition system. The first level of benefit in line acquisitions comes with accurately planning a path to the line, which can be helpful for any self propelled vehicle. It enables the vehicle control system to be tuned more accurately, since it no longer requires acquiring and tracking gains to be separately maintained by the vehicle's guidance module. Additionally, generation of an acquisition path by the guidance line acquisition system can mitigate overshoot since the path is known in entirety.

The second level of benefit comes when the inverse kinematics of an implement attached to the vehicle are applied, and second path is generate for the tractor such that a towed implement will follow the original guided line acquisition path. In FIG. 1B, the actual driven implement path 18 represents the path that the implement follows. As illustrated in FIG. 1B, the implement 12 does not reach the final guidance line 14 until 20 m on the final guidance line 14.

Figure 1C:
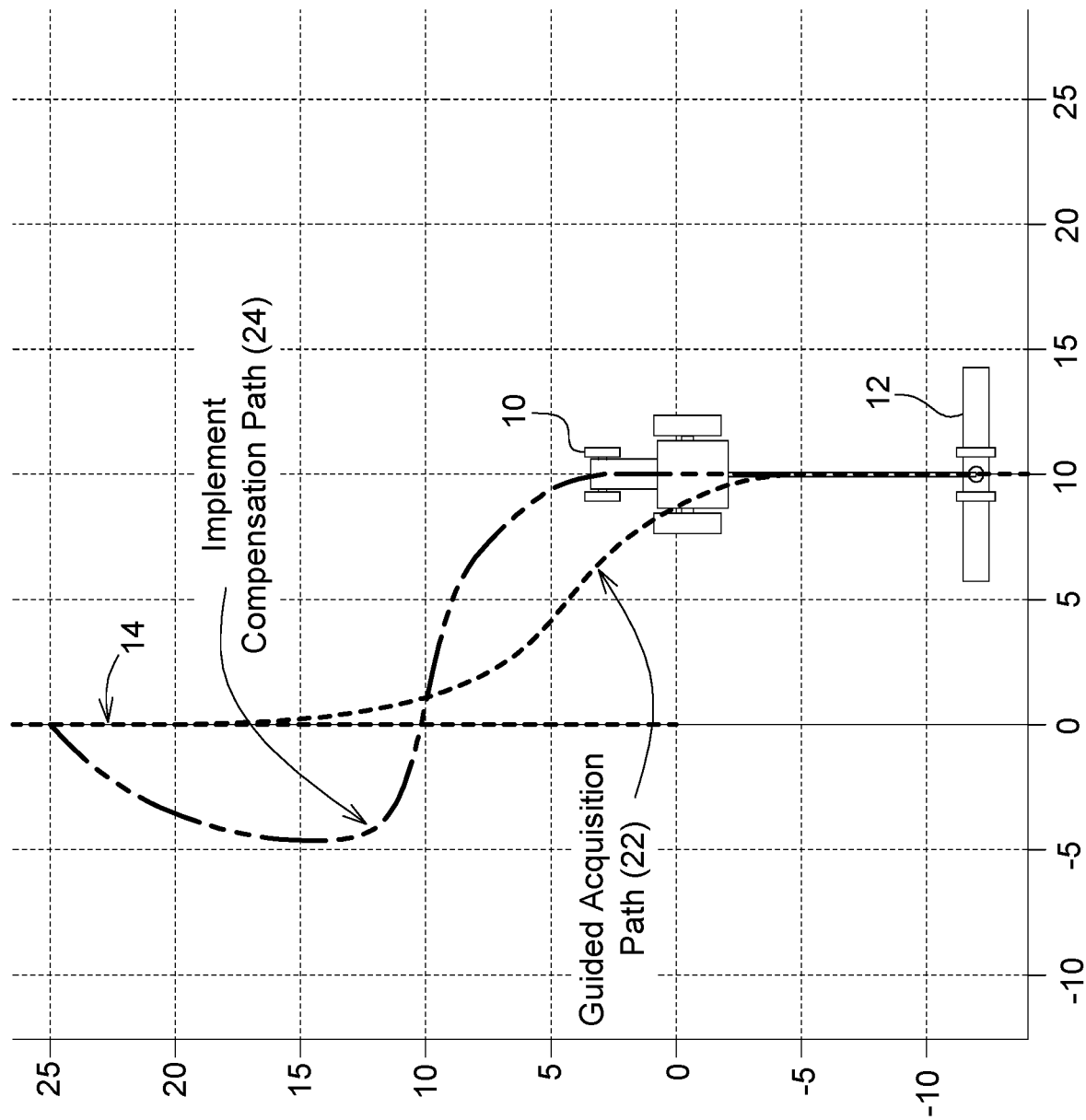
FIG. 1C is a graph illustrating a vehicle path and an implement path from a first location to a final guidance line using the guided line acquisition system of the present disclosure, in accordance with certain embodiments.

Turning to FIG. 1C, which illustrates an embodiment of a guided line acquisition system that includes guided line acquisitions and implement compensation determinations. In this embodiment, the guided line acquisition system provides a second planned path for the vehicle based on the path of the implement attached to the vehicle. This system provides an achievable command based on the vehicle minimum turn radius or the implement minimum turn radius, and a configurable angle of approach. Such a configuration provides near perfect implement acquisition.

When a vehicle 10 includes an implement 12, if the vehicle 10 is moved towards the final guidance line without consideration of the implement 12, the vehicle 10 path causes exponential decay of lateral error at the implement while the implement 12 is off track. In other words, the implement is in the wrong position for a sustained period of time. In this embodiment, to account for the implement 12, the guided line acquisition system of the present disclosure utilizes inverse kinematics to predict the path that the vehicle needs to drive for the implement to maintain position on its acquisition path. Accordingly, in this embodiment, the guided line acquisition system provides a guided acquisition path 22 and a second implement compensation path 24, which represents the path that the vehicle 10 must follow so that the implement 12 reaches the end path 14. In FIG. 1C, the actual driven tractor path 16 is much wider than the actual driven implement path 18 so that the implement reaches the end path 14 more efficiently. As illustrated, the implement 12 reaches the final guidance line 14 at 10 m based on the implement compensation path 24. Accordingly, in this embodiment, the implement reaches to the final guidance line faster than in the embodiment illustrated in FIG. 1B. More specifically, in this embodiment, the vehicle actually covers more distance than the previous case, but the implement covers less inline distance (which is the key metric).

It should be appreciated that this feature could be extensible to front mounted implements and mounted implements, in addition to towed implements. It should also be appreciated that this can continue to be extended for each additional implement in the implement train, for instance, with tow between air carts, the rear most implement is desired to be precisely controlled, and as such the implement inverse kinematics must be applied twice to get the ideal tractor path.

Figure 2:
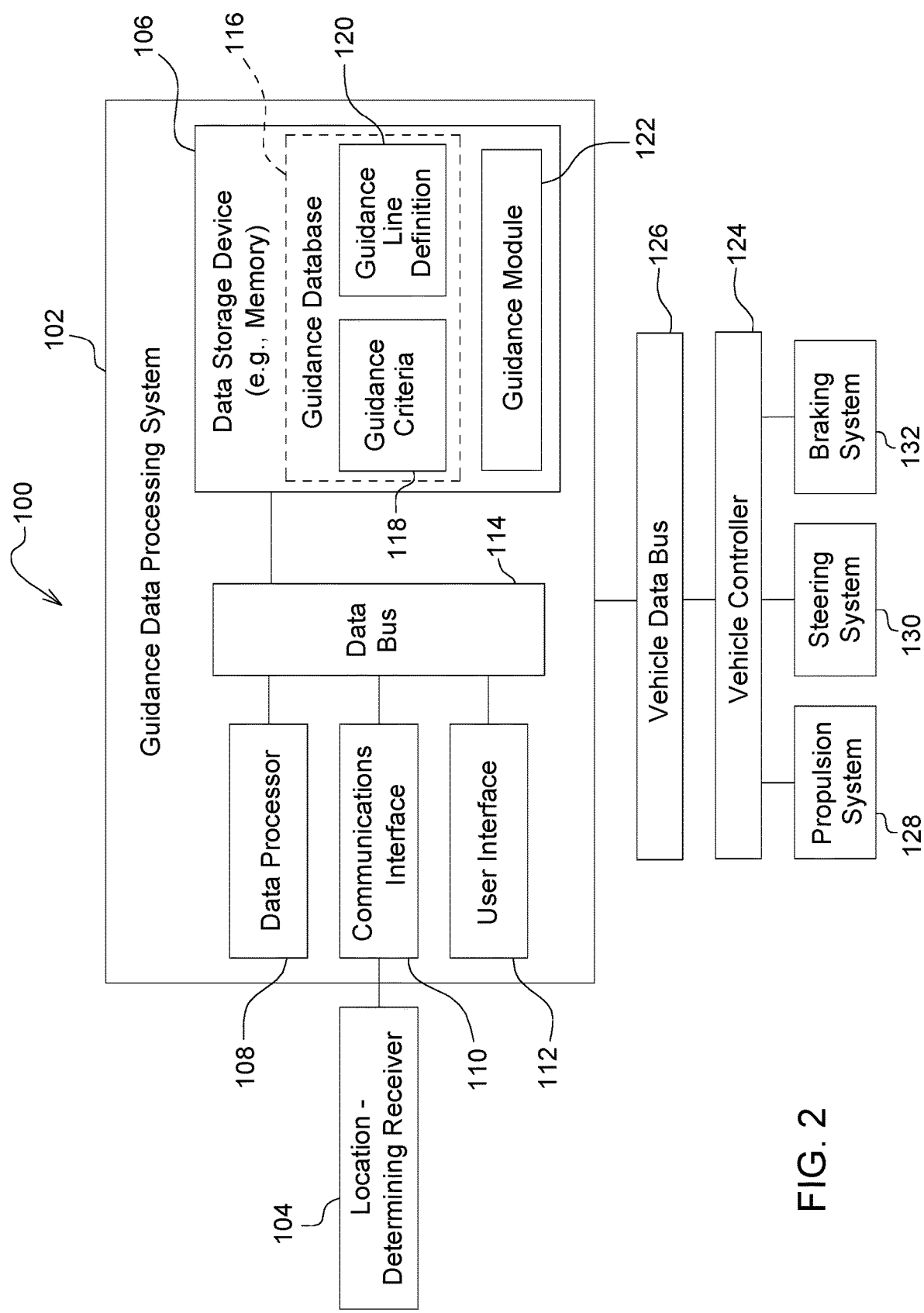
FIG. 2 is a block diagram of a guided line acquisition system of the present disclosure, in accordance with certain embodiments.

FIG. 2 illustrates an example guided line acquisition system 100 for planning and generating an acquisition path for a work vehicle, such as a tractor, mower, agricultural equipment, construction equipment, or other work vehicle, in accordance with embodiments. As shown, the system 100 includes a guidance data processing system 102 (e.g., an electronic data processing system) coupled to a location determining receiver 104. In some embodiments, the guidance data processing system 102 can be embedded in a vehicle electronics system of the vehicle. In other embodiments, the guidance data processing system 102 can be a stand-alone guidance computer communicatively coupled to the vehicle electronics system.

As shown in FIG. 2, the guidance data processing system 102 (also referred to herein as a "guidance system 102") comprises a data storage device 106, a data processor 108 (e.g., an electronic data processor), a communications interface 110, a user interface 112, and a data bus 114. In certain embodiments, the guidance system 102 can comprise a general purpose computer that is programmed with various programming instructions or modules stored in the data storage device 106, or elsewhere. The data processor 108 can communicate with any one of the data storage device 106, the communications interface 110, the user interface 112, and the location-determining receiver 104 via the data bus 114. In embodiments, the data processor 108 can comprise one or more of a microprocessor, a microcontroller, a programmable logic array, an application-specific integrated circuit, a logic device, or other electronic device for processing, inputting, outputting, manipulating, storing, or retrieving data.

The data storage device 106 can comprise one or more of electronic memory, nonvolatile random access memory (e.g., RAM), flip-flops, a computer-writable or computer-readable storage medium, a magnetic or optical data storage device, a magnetic or optical disc drive, a hard disk drive, or other electronic device for storing, retrieving, reading, or writing data. In some embodiments, the data storage device 106 includes a guidance database 116 for storing guidance data and geographical information associated with implementing the guidance data processing system 102 or the techniques disclosed herein. For example, as shown in FIG. 2, the guidance database 116 can store guidance criteria 118 and guidance line definitions 120. In other embodiments, the guidance database 116 may have a distributed architecture where one or more components are situated remote from another (e.g., in a network or cloud arrangement), but are still accessible by the data processor 108. In some cases, the information stored in the guidance database 116 can be received from other vehicle(s) working in the field at the same time as the vehicle or from one or more vehicles that worked in the field during a prior period in time.

According to embodiments, the guidance criteria 118 can include predefined rules, attributes, sorting logic, or algorithms for prioritizing, ranking, sorting, or otherwise selecting between a plurality of guidance line(s). In embodiments, the guidance criteria 118 includes one or more of the following: a proximity of the final guidance line to a current vehicle location, an angle of approach towards the final guidance line from the current vehicle location, and a minimum turning radius of the vehicle. In some embodiments, the guidance criteria 118 can be configured to meet operator preferences and/or vary depending on the field operation being performed. For example, for planting operations, the guidance criteria 118 may include a pointing direction of a planting implement of the vehicle, whereas for spraying operations, the guidance criteria 118 may include a spray angle of a spraying implement of the vehicle. In some embodiments, the guidance criteria 118 further includes predefined traffic patterns for a given field or work area to help maintain a clear path for the vehicle when the area is being worked by more than one vehicle.

In embodiments, the guidance line definitions 120 comprise geographical information including (i) one or more of geographical coordinates or points, line or line segment definitions, and/or boundary line definitions for defining a plurality of final guidance lines, (ii) boundary or bounding box definitions for defining a plurality of geospatial regions with reference to at least one of the plurality of final guidance lines, as well as one or more of geographical coordinates or points, line or line segments, and boundary lines, and (iii) names or other identifying information for each of the plurality of final guidance lines and the plurality of geospatial regions.

The data storage device 106 also stores one or more software program modules or software instructions, including a guidance module 122, for execution by the data processor 108. According to embodiments, the guidance module 122 is configured, or adapted, to generate a guided line acquisition path and an implement compensation path for the vehicle based on a minimum turn radius and an angle of approach.

The user interface 112 can comprise one or more of a display (not shown), a touchscreen, a keyboard, a keypad, a switch, a pointing device (e.g., electronic or optical mouse), or other device for inputting, entering, receiving, capturing, displaying, or outputting data associated with the guidance data processing system 102 or the techniques disclosed herein. For example, the user interface 112 can be configured to display, to an operator of the vehicle, the potential guidance lines for the vehicle. In some cases, the user interface 112 graphically displays a map comprising the at least one geospatial region and the potential guidance lines associated therewith. In other cases, the user interface 112 displays a list of names corresponding to the potential guidance lines. In some embodiments, the user interface 114 is further configured to receive a user input to engage automation of an acquisition path for the vehicle to reach the final guidance line. The guidance data processing system 102 then communicates with the vehicle controller 124 through the vehicle data bus 122 for controlling the path of the vehicle. In other embodiments, the guidance module 122 automatically generates an acquisition path for the vehicle.

The communications interface 110 comprises one or more of a transceiver, data port (e.g., input/output data port), parallel data port, serial data port, or other communications devices that facilitates communications between the guidance data processing system 102 and a location-determining receiver 104. The location-determining receiver 104 comprises a receiver that uses satellite signals, terrestrial signals, or both to determine a current, or present, location or position of the vehicle. The location-determining receiver 104 can provide location data (e.g., longitudinal coordinates, latitudinal coordinates, altitude/elevation measurements, etc.) to the data processor 108 and/or the guidance module 122 via the communications interface 110 and the data bus 114.

In one embodiment, the location-determining receiver 104 is a Global Positioning System (GPS) receiver with a differential correction receiver for providing precise measurements of the geographic coordinates or position of the vehicle. As an example, the differential correction receiver may receive satellite or terrestrial signal transmissions of correction information from one or more reference stations with generally known geographic coordinates to facilitate improved accuracy in the determination of a location for the GPS receiver. In another embodiment, the location-determining receiver 104 is a Global Navigation Satellite System (GNSS) receiver that uses the GPS, Galileo, BeiDou, GLONASS, or other satellite systems to precisely pinpoint a current geographic location of the vehicle, for example, by using various satellite signals to triangulate the position of the vehicle.

In some embodiments, the communications interface 110 further includes one or more transceivers, ports, modems, or other communication devices for facilitating communication between the guidance data processing system 102 and one or more other vehicles, or a remote server in communication with said vehicles, for example, in order to receive information from, and/or provide information to, another vehicle that is simultaneously working a given field or work area, has previously worked the area, and/or will work the area at a future point in time. The communicated information may be used, for example, to avoid overlap and/or crossover between multiple vehicles working in a given area. In embodiments, the communicated information can include a current guidance line or path of the vehicle and/or any other vehicle(s) in the area, one or more previously-utilized guidance lines or paths of the vehicle and/or any other vehicle(s) in the area, and a current position of the vehicle and/or the other vehicle(s) in the area.

In embodiments, the system 100 can further comprise components of a vehicle electronics system, including a vehicle controller 124, a vehicle data bus 126, a propulsion system 128, a steering system 130, and a braking system 132. The vehicle data bus 126 can communicatively couple the vehicle controller 124 to the guidance data processing system 102, as well as other components (not shown) of the vehicle electronics system or one or more implement electronic systems coupled to the vehicle (e.g., digger, planting member, etc.). For example, outputs of the guidance data processing system 102 can be applied to an implement electronics system to enable control logic for input application machines (e.g., planters) and other equipment. In one embodiment, the guidance system 102 represents a network element that communicates with the vehicle controller 124 over the vehicle data bus 126, such as, e.g., a controller area network (CAN) bus.

The vehicle controller 124 can comprise one or more devices for controlling or navigating the vehicle consistent with a path determined or planned by the guidance module 122 or other instructions provided by the operator. The vehicle controller 124 may be configured to communicate data messages to the propulsion system 128, the steering system 130, and the braking system 132 in accordance with the planned path of the vehicle or other instructions.

The steering system 130 can comprise one or more of a rack-and-pinion steering system, a mechanical linkage, a hydraulic steering system, an electro-hydraulic steering system, an electronic drive-by-wire system, an electrically-assisted mechanical steering linkage, or other mechanism for steering or turning one or more wheels of the vehicle. The steering system 130 can include an electronic or electrical interface for communicating data messages via the vehicle data bus 126 and for monitoring and controlling the steering of the vehicle. For example, the steering system 130 is capable of communicating data messages (e.g., control and status message) to the vehicle controller 124 or the data processor 108.

The propulsion system 128 can comprise one or more of an internal combustion engine, an electric motor, a hybrid propulsion configuration that comprises a combination of an internal combustion engine and one or more electric motors, or the like. The propulsion system 128 has an electrical or electronic interface (e.g., engine controller, transmission controller, or a combination thereof) for communicating data messages via the vehicle data bus 126 and for monitoring and controlling the propulsion of the vehicle. For example, the propulsion system 128 is capable of communicating the data messages (e.g., control and status messages) to the vehicle controller 124 or the data processor 208.

The braking system 132 comprises one or more of a mechanical braking system, a cable braking system, a hydraulic braking system, an electromechanical braking system, a pneumatic braking system, an air-braking system, a brake-by-wire system, or the like. The braking system 132 has an electronic or electrical interface (e.g., braking controller) for communicating data messages via the vehicle data bus 126 and for monitoring and/or controlling the braking, deceleration, slowing, or stopping of the vehicle. For example, the braking system 132 is capable of communicating data messages (e.g., control and status messages) to the vehicle controller 124 or the data processor 108.

Figure 3:
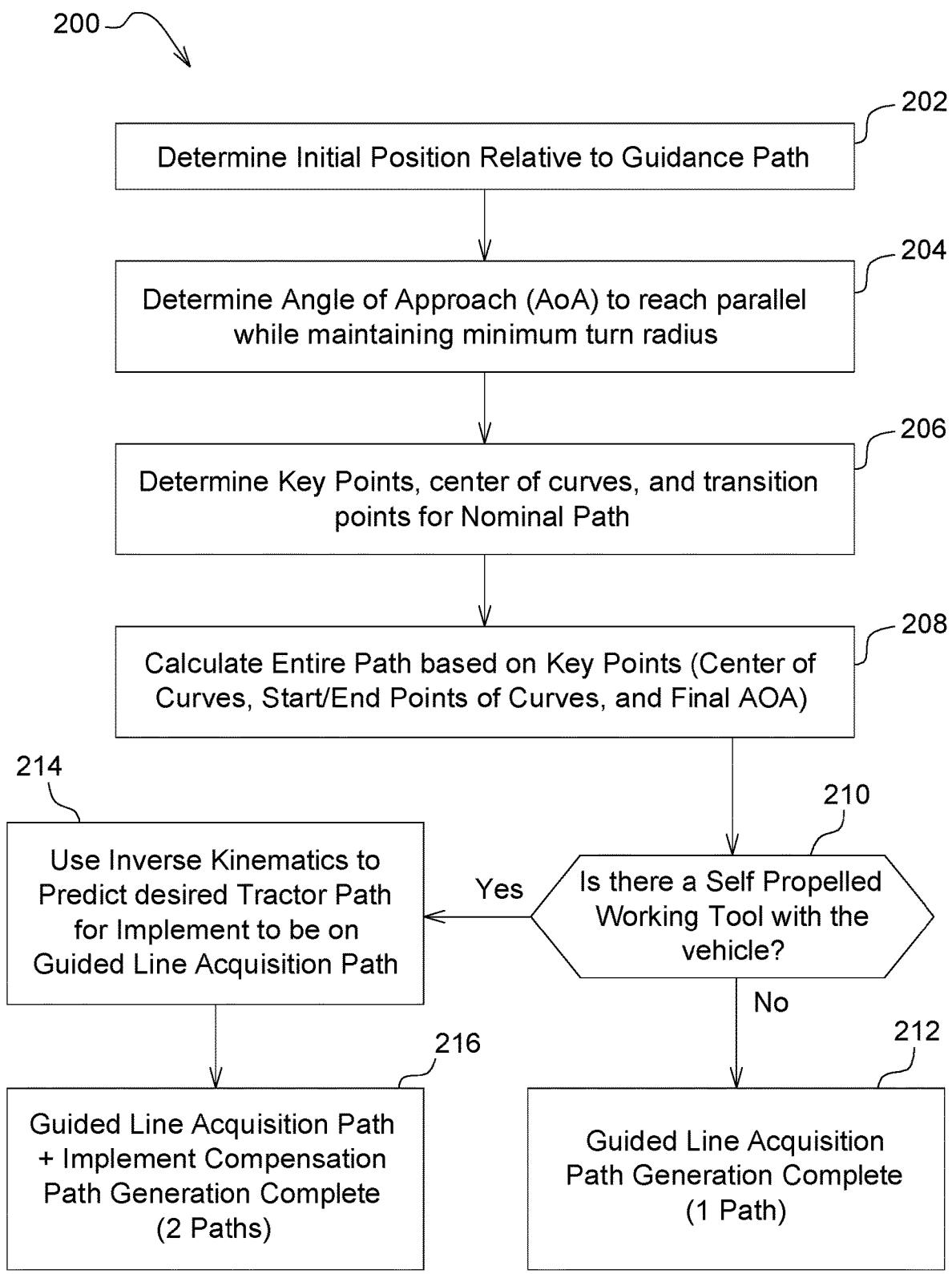
FIG. 3 is a flowchart of an example method for generating a guidance path for a vehicle to a final guidance line, in accordance with certain embodiments.

Referring now to FIG. 3, shown is an example method 200 for planning or generating an acquisition path for a vehicle, in accordance with embodiments. The method 200 can be carried out by the system 100, or more specifically, through interactions between various components of the system 100 that are facilitated by software executing on one or more electronic data processors associated with said components. For example, the guidance data processing system 102 may interact with the location-determining receiver 104, and the vehicle controller 124, to carry out the operations of the method 200, and all or a portion of the method 200 can be implemented in software (such as, e.g., the guidance module 122) that is executable by the data processor 108 and stored in the data storage device 106. Accordingly, in the following paragraphs, the method 200 will be described with reference to the components of the system 100.

It should also be appreciated that in certain embodiments, the user engages the guided line acquisition system to generate and implement the acquisition path from a user display. More specifically, through the use of various inputs on a user interface, a user initiates method 200, generation of an acquisition path for the vehicle when the user selects a final guidance line for the vehicle. For example, in one embodiment, the user chooses a desired final guidance line from the user interface. In certain embodiments, the potential final guidance lines can be displayed to the vehicle operator on the user interface 112 (e.g., a display screen or touchscreen), and the user interface 112 can include an input device (e.g., a touchscreen, keyboard, joystick, or mouse)

configured to receive user selection of the selected one of the potential guidance lines. In this example embodiment, the user also enters the vehicle and/or implement dimensions through a user interface. In another example embodiment, the vehicle and/or implement dimensions are pre-populated into the user interface. After selecting a guidance line, the user then selects an input (i.e., "Resume") to engage automation of the guided acquisition path, which initiates the method 200 of generating an acquisition path.

Referring back to FIG. 3, the method 200 begins at step 202, where location data representing a current location of the vehicle is determined by the location-determining receiver 104. It should be appreciated that the current vehicle location information includes a current vehicle position, and the direction of heading of the vehicle. In certain embodiments, the guidance module 122 receives the initial position of the vehicle. The location data can be provided to the data processor 108, and/or the guidance module 122 executing thereon, via the communications interface 110 and the data bus 114. In some embodiments, the location-determining receiver 104 provides the location data to the guidance system 102 only if new location data is detected (e.g., upon comparison with previously-acquired location data). In other embodiments, the location-determining receiver 104 continuously or periodically provides the location data to the guidance system 102 and the data processor 108 determines whether the received location data is new (e.g., the vehicle has moved) or old (e.g., the vehicle is stationary).

At step 204, based on the location data received from the location-determining receiver 104 and geographical information retrieved from the guidance database 116, the guidance system 100, or more specifically, the guidance module 122, determines an angle of approach to reach parallel of the end path while maintaining the minimum turn radius of the vehicle. The angle of approach is one example of guidance criteria stored or generated in the guidance criteria module 118 of the guidance database. As an example, the guidance criteria 118 can include determining, for each guidance line, the angle of approach to the current vehicle location and ranking the potential guidance lines according to the closest approach angle. In certain embodiments, one or more of the guidance criteria 118 can be user-configured, including, for example, entered by the vehicle operator or otherwise based on preferences of the vehicle operator, an employer of the operator, an owner of the field 300 and/or the vehicle, or another entity associated with the field 300 and/or the vehicle. The guidance criteria 118 can also be configured to maximize efficiency of field operations in the field, including, for example, minimizing wastage during an application (e.g., spraying, seeding, fertilizing, etc.), minimizing overlap of travel paths by the vehicle or any other vehicles working the field at the same time, minimizing travel time and fuel usage, and minimizing difficulty in maneuvering the vehicle (e.g., by avoiding sharp turns or tight approach angles).

In certain embodiments, the guidance module 122 may be capable of, or programmed with software instructions for, comparing the received location data with guidance line definitions 120 stored in the guidance database 116 and the requisite angle of approach stored in the guidance criteria 118 in order to reach a final guidance line based on the current vehicle location.

At step 206, the guidance system 100, or more specifically, the guidance module 122, determines key points, center of curves, and transition points for a nominal path to the final guidance line. In one embodiment, the key points, center of curves and transition points are various metrics utilized by the guidance module to generate a path for the vehicle to the final guidance line. In certain embodiments, these metrics are another example of guidance criteria 118 that are generated or stored in the guidance criteria module of the guidance database 120. It should be appreciated that in various alternative embodiments, other metrics may be used to determine the acquisition path.

It should further be appreciated that under certain circumstances, the method 200 includes determining key points, center of curves, and transition points for a modified path to the final guidance line, rather than what is referred to above as a "nominal" path. In one embodiment, the nominal path refers to situations in which a vehicle is able to reach parallel of the final guidance line before crossing it, the initial heading of the vehicle is less than the determined angle of approach, and the vehicle is capable of reaching the determined angle of approach. Under certain circumstances, because of the vehicle position, one or more of these constraints may not be met. For example, (1) the vehicle is unable to reach the parallel of the final guidance line before crossing the final guidance line, or (2) the initial vehicle heading is greater than the determined angle of approach, or (3) the vehicle is unable to reach the determined angle of approach due to limitations based on the minimum turn radius of the vehicle or some other constraint. Under these circumstances, in one embodiment, the method 200 includes determining key points, center of curves, and transition points for a modified path to the final guidance line. At step 208, the guidance system calculates the entire path based on key points, which include the center of curves, start and end points of the curves, transitions to and from curvatures, and a final angle of approach.

After step 208, the guidance system determines whether there is an implement attached to the vehicle that needs a compensated vehicle path, at step 210. If the vehicle does not include a implement, such as a self propelled working tool, the method 200 includes completing the generation of a guided line acquisition path for the vehicle. An example embodiment of such a scenario is described above with respect to FIG. 1B.

If on the other hand, an implement is attached to the vehicle, the method 200 includes use of inverse kinematics to predict a desired compensated vehicle path for the implement to reach the guided line acquisition path, at step 214. More specifically, the method 200 includes utilizing inverse kinematics to determine the path of the implement if the vehicle is moved along the calculated path based on step 208, without consideration of the implement.

After predicting a desired tractor path for the implement to be on the guided line acquisition path, the method includes completing generation of a second implement compensation path, at step 216. More specifically, the method 200 includes determining a path for the vehicle to travel that will compensate for the attached implement to the vehicle by using the predicted path of the implement. By working backwards, the method 200 provides a second path for the vehicle to follow that enables the implement to reach the final guidance line more efficiently and effectively to reduce time and distance traveled in error. It should be appreciated that the guided line acquisition system may also be applied in a similar manner for other applications such as tow-behind air carts or implement trains.

It should be appreciated that guidance errors are calculated as the vehicle transverses the guided line acquisition path and AutoTrac keeps the vehicle on the path. When guided line acquisition path and desired guidance path are co-linear, the guidance system switches to the desired guidance path tracking.

From step 212 and/or 216, the guidance module 122 provides the generated acquisition path (and the implement compensation path) to the vehicle controller 124 to resume guidance of the vehicle. Upon receiving the generated acquisition path (and the implement compensation path), the vehicle controller 124 can direct the path of the vehicle by sending control messages to one or more of the propulsion system 128, steering system 130, and braking system 132.

In some embodiments, the guidance line for controlling the path of the vehicle is selected by the user, or received via the user interface 112 as a user input, for example, in a user-selectable mode of the user interface 112. In other embodiments, the acquisition path and/or the implementation compensation path for controlling the path of the vehicle is automatically selected and executed by the guidance module 122. For example, the guidance module 122 can be configured to automatically provide the generated paths to the vehicle controller without input from the user. For example, in certain embodiments, the vehicle operates in autonomous mode or in automatically steered mode with operator supervision to seize control from the automated steering system by steering the wheel, adjusting the throttle or activating brakes (e.g., to avoid an obstacle or hazard in the field). In such an embodiment, the guided line acquisition system provides a pre-established path plan, which can be implemented with differential correction with a reference satellite correction signal and by the location-determining receiver. In certain embodiments including autonomous operation, the operator can select a particular guidance mode or preference on the user interface in advance of the vehicle executing the planned path. In other embodiments, the vehicle operator may be provided with an option to override the automatically-implemented acquisition path by selecting, via the user interface 112, an appropriate user input.

Thus, systems and methods are described herein for facilitating an autonomous mode for controlling the path of a work vehicle toward a final guidance line. Accordingly, the techniques disclosed herein can reduce the amount of skill and interaction needed from a vehicle operator while engaged in a field operation and can produce more efficient path plans that, for example, avoid unnecessary fuel consumption, increased travel distances, excessive vehicle turns, or increased vehicle operation time. Further, these techniques can enhance autonomous machine operations by automatically developing and defining the criteria for reaching a final guidance line, thereby enabling more precise and customized control of the vehicle during field operations.

In certain embodiments, the process descriptions or blocks in the figures, such as FIG. 2, can represent modules, segments, or portions of code which include one or more executable instructions for implementing specific logical functions or steps in the process. Any alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

What is claimed is:

1. A system for automatically generating an acquisition path for a vehicle to a final guidance line, the system comprising:
    a location-determining receiver configured to determine location data representing a current vehicle location from the location-determining receiver,
    a guidance module configured to:
        determine a first acquisition path traversable by the vehicle based on a determined angle of approach and guidance criteria, the first acquisition path to reduce a lateral error between the current vehicle location and the final guidance line, and
        determine whether an implement is attached to the vehicle,
        when the implement is attached to the vehicle:
            determine a second acquisition path traversable by the implement to end on the final guidance line, and
            generate a compensation path traversable by the vehicle by modifying the first acquisition path so that the movement of the vehicle along the compensation path causes the implement to move along the second acquisition path,
    a data storage device configured to store the guidance module and a guidance database; and
    a data processor in communication with the data storage device configured to execute the guidance module.

2. The system of claim 1, wherein the angle of approach is limited by a minimum turning radius of the vehicle.

3. The system of claim 1, wherein the determining of the first acquisition path includes determining at least one metric including a key point, a center of a curve, and a transition point, for the first acquisition path.

4. The system of claim 1, wherein the guidance criteria includes one or more of a proximity of the guidance line to the current vehicle location, the angle of approach to the guidance line from the current vehicle location, and a position of the guidance line in a predefined sequence.

5. The system of claim 1, further including a user interface configured to enable a user to initiate the determination of the first acquisition path and the compensation path.

6. The system of claim 1, wherein the guidance module is configured to determine the second acquisition path using inverse kinematics of the implement attached to the vehicle.

7. The system of claim 1, further including a vehicle controller and a vehicle steering system.

8. The system of claim 7, wherein the guidance module is further configured to provide the first acquisition path and the compensation path to the vehicle controller for controlling a path of the vehicle.

9. The system of claim 7, wherein the vehicle controller is configured to control the vehicle steering system based on the first acquisition path and the compensation path.

10. A method for automatically generating an acquisition path for a vehicle to a final guidance line, the method comprising:
    determining, via a location-determining receiver, location data representing a current vehicle location from the location-determining receiver,
    determining, via a guidance module, a first acquisition path traversable by the vehicle based on a determined angle of approach and guidance criteria, the first acquisition path to reduce a lateral error between the current vehicle location and the final guidance line, determining, via the guidance module, whether an implement is attached to the vehicle, when the implement is attached to the vehicle:

determining, via the guidance module, a second acquisition path traversable by the implement to end on the final guidance line, and generating a compensation path traversable by the vehicle by modifying the first acquisition path so that the movement of the vehicle along the compensation path causes the implement to move along the second acquisition path, storing at a data storage device the guidance module and a guidance database; and executing, via a data processor in communication with the data storage device, the guidance module.

11. The method of claim 10, wherein the angle of approach is limited by a minimum turning radius of the vehicle.

12. The method of claim 10, wherein the determining of the first acquisition path includes determining at least one metric including a key point, a center of a curve, and a transition point, for the first acquisition path.

13. The method of claim 10, wherein the guidance criteria includes one or more of a proximity of the guidance line to the current vehicle location, the angle of approach to the guidance line from the current vehicle location, and a position of the guidance line in a predefined sequence.

14. The method of claim 10, further including displaying, via a user interface, a user input to enable a user to initiate the determination of the first acquisition path and the compensation path.

15. The method of claim 10, wherein the guidance module is configured to determine the second acquisition path using inverse kinematics of the implement attached to the vehicle.

16. The method of claim 10, further including a vehicle controller and a vehicle steering system.

17. The method of claim 16, wherein the guidance module is further configured to provide the first acquisition path and the compensation path to the vehicle controller for controlling a path of the vehicle.

18. The method of claim 16, wherein the vehicle controller is configured to control the vehicle steering system based on the first acquisition path and the compensation path.

19. A system for automatically generating an acquisition path for a vehicle to a final guidance line, the system comprising:

a location-determining receiver configured to determine location data representing a current vehicle location from the location-determining receiver, a guidance module configured to:

determine an acquisition path traversable by the vehicle based on a determined angle of approach and guidance criteria, the acquisition path to reduce a first lateral error between the current vehicle location and the final guidance line, and determine a compensation path traversable by the vehicle based on an implement being attached to the vehicle, the compensation path to cause the implement to traverse a second acquisition path to reduce a second lateral error between a current location of the implement and the final guidance line while disregarding the first lateral error, a data storage device configured to store the guidance module and the a guidance database; and a data processor in communication with the data storage device configured to execute the guidance module.

20. The system of claim 19, wherein the angle of approach is limited by the a minimum turning radius of the vehicle.

21. The system of claim 19, wherein the determining of the acquisition path includes determining at least one metric including a key point, a center of a curve, and a transition point, for the acquisition path.

22. The system of claim 19, wherein the guidance criteria includes one or more of a proximity of the guidance line to the current vehicle location, the angle of approach to the guidance line from the current vehicle location, and a position of the guidance line in a predefined sequence.

23. The system of claim 22, wherein the guidance module is further configured to provide the determined acquisition path and the determine compensation path to a vehicle controller for controlling a path of the vehicle.

24. The system of claim 23, wherein the vehicle controller controls the vehicle steering system based on one of the determined acquisition path or the determine compensation path.

25. The system of claim 19, further including a user interface configured to enable a user to initiate the determination of the acquisition path and the compensation path.

* * * * *